US008894789B2

(12) United States Patent  
Chang

(10) Patent No.: US 8,894,789 B2  
(45) Date of Patent: Nov. 25, 2014

(54) METHOD FOR PRODUCING AN ARTIFICIAL WOOD AND ARTIFICIAL WOOD PRODUCT

(76) Inventor: Yong Leong Chang, Singapore (SG)

( * ) Notice: Subject to any disclaimer, the term of this patent is extended or adjusted under 35 U.S.C. 154(b) by 0 days.

(21) Appl. No.: 13/641,838

(22) PCT Filed: Feb. 24, 2011

(86) PCT No.: PCT/SG2011/000077  
§ 371 (c)(1),  
(2), (4) Date: Oct. 17, 2012

(87) PCT Pub. No.: WO2011/119108  
PCT Pub. Date: Sep. 29, 2011

(65) Prior Publication Data  
US 2013/0071607 A1 Mar. 21, 2013

(30) Foreign Application Priority Data

Mar. 25, 2010 (SG) .................................. 201002041

(51) Int. Cl.  
*B32B 37/14* (2006.01)  
*B32B 5/26* (2006.01)  
*B32B 5/12* (2006.01)  
*B32B 21/02* (2006.01)  
*B32B 5/28* (2006.01)  
*B32B 21/00* (2006.01)

(52) U.S. Cl.  
CPC ..... *B32B 5/12* (2013.01); *B32B 5/26* (2013.01); *B32B 21/02* (2013.01); *B32B 37/14* (2013.01); *B32B 5/28* (2013.01); *B32B 21/00* (2013.01)  
USPC .............. 156/182; 156/60; 428/114; 428/151

(58) Field of Classification Search  
CPC ........... B27L 5/00; B32B 21/00; B32B 21/02; B32B 5/12; B32B 5/26; B32B 5/28; B32B 11/042; B32B 21/04; B32B 21/042; B32B 3/14; B27D 1/04  
USPC ........... 156/60, 182, 246; 428/106, 114, 107, 428/108, 151  
See application file for complete search history.

(56) References Cited

U.S. PATENT DOCUMENTS 7,347,912 B2 * 3/2008 Engel et al. ................... 156/153

FOREIGN PATENT DOCUMENTS

| JP | 3-39212 | 2/1991 |
| JP | 2000-135706 | 5/2000 |
| JP | 2001-145908 | 5/2001 |

OTHER PUBLICATIONS

International Search Report mailed Sep. 2, 2011 for PCT/SG2011/000077.

*Primary Examiner* — Margaret Squalls  
(74) *Attorney, Agent, or Firm* — Lowe Hauptman & Ham, LLP

(57) ABSTRACT

The invention relates to a method for producing an artificial wood product from fibers and bonding agent and to an artificial wood product comprising fibers and bonding agent. The objective of the invention is to disclose a new kind of method and a product which allows a production of an artificial wood having an outer appearance just like a natural wood. In the method several fibers are aligned longitudinally to form a strand wire, several said strand wires are bonded with said bonding agent unidirectionally and side by side together to form a fiber sheet, and several said fiber sheets are stacked and bonded with said bonding agent one upon the other in layers to form an elongated wood product in which said sheets replicate the pattern of annular growth rings of a natural wood.

8 Claims, 1 Drawing Sheet

METHOD FOR PRODUCING AN ARTIFICIAL WOOD AND ARTIFICIAL WOOD PRODUCT

CROSS REFERENCE TO RELATED APPLICATION

Figure 1:
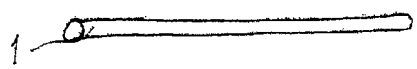

This application claims the priority of Singapore Patent Application No. 201002041-0, filed on Mar. 25, 2010 in the the intellectual Property Office of Singapore (IPOS). Further, this application is the National Phase application of International Application No. PCT/SG2011/000077 filed Feb. 24, 2011, which designates the United States and was published in English.

FIELD OF THE INVENTION

The invention relates to a method for producing an artificial wood product from fibres and bonding agent and to an artificial wood product comprising fibres and bonding agent.

BACKGROUND OF THE INVENTION

The growing demand for natural wood and especially rare and beautiful tropical hardwood has led to tropical deforestation and so to serious environmental problems not only locally but also globally.

It has been previously known to make planks and boards from polymer wood fiber composite only by adding fiber into resin and then compressing said composite into a mould to form a desired shape of product. This kind of plastic fiber boards have quite a monotone and unnatural appearance. Although this kind of products can stand wet conditions and also high and low temperatures, they cannot substitute natural wood products in terms of appearance, application and processing.

OBJECTIVE OF THE INVENTION

The objective of the invention is to eliminate the drawbacks referred to above. One specific objective of the invention is to disclose a new kind of method and a product which allows a production of an artificial wood having an outer appearance just like a natural wood. A further objective of the invention is to disclose an artificial wood which can be handled, such as sawn, planed smooth and sanded down just like a natural wood. Still a further objective of the invention is to give us people better possibilities to stop or at least to decrease tropical deforestation.

SUMMARY OF THE INVENTION

The method in accordance with the invention for producing an artificial wood product from fibres and bonding agent comprises the steps: several fibres are aligned longitudinally to form a strand wire; several said strand wires are bonded with said bonding agent unidirectionally and side by side together to form a fibre sheet; and several said fibre sheets are stacked and bonded with said bonding agent one upon the other in layers to form an elongated wood product in which said sheets replicate the pattern of annular growth rings of a natural wood.

In an embodiment of the invention fibres are bonded together in a strand wire with said bonding agent. On the average the thickness of a strand is about 20-100 microns, the width 500-2000 mm and the length can be even from meters to hundreds of meters handled in rolls. For instance if the length of the wood is going to be 6 meters, the strands should be cut at 6 meters length from the roll.

In a further embodiment of the invention said sheets are stacked together unidirectionally to form said elongated wood product. It is also possible in certain embodiments of the invention to stack these sheets together with variable directions of the fibres in different sheets depending on the desired outer appearance of the final product.

In a further embodiment of the invention said sheets are stacked together to form said elongated wood product with a rectangular; square, half-round or round cross-section. Also the cross-section and the outer surface of the product can resemble a natural wood trunk. So in the inventive method it is possible to make final or semi-final product, the outer appearance of which can be almost anything depending on the usage of the product. Also it is possible to use a certain form of a mould to create a certain form of an elongated product.

In a further embodiment of the invention the thickness of said sheets are adjusted in different layers to replicate the variation of the thickness of annular growth rings of a natural wood. So the number of strand wires in different sheets can vary depending on the desired thickness of a certain sheet, ie. the desired thickness of a certain annular growth ring.

In a further embodiment of the invention the colour of said sheets are adjusted in different layers to replicafe the variation of the colour of annular growth rings of a natural wood. So it is possible to stain different fibres separately, different strand wires separately or different sheets separately. Also it is possible to stain said bonding agent. So any kind of pigment can be used alone or separately in different components of the product so that a desired outer appearance of the product can be received.

In a further embodiment of the invention said elongated wood product is handled just like a natural wood trunk. So it can be sawn into a lumber, board, plank or balk of smaller cross-sections. Also the surface of said wood product or already sawn smaller peace can be planed and/or sanded down.

It is even possible to produce artificial trunks that can be rotary-cut into veneers having a thickness of only a couple of millimeters. These veneers can be glued with said bonding agent into thicker plywood.

Depending on the size and structure of the final product, it is possible to use a high pressure vacuum curing system to hold all the fibres in contact with each other until the bonding agent has hardened completely.

The artificial wood product in accordance with the invention comprises strand wires made of longitudinally aligned fibres. In the product said strand wires are bonded with said bonding agent unidirectionally and side by side together to form a fibre sheets. Further more several of said fibre sheets are stacked and bonded with said bonding agent one upon the other in layers to form an artificial wood product in which said sheets replicate the pattern of annular growth rings of a natural wood.

In the invention said fibre can be almost any natural or artificial fibre and advantageously said fibre is jute fibre, hem fibre, palm tree fibre, coconut fibre or bamboo fibre.

In the best embodiment of the invention said bonding agent is polyester resin. At this moment polyester resin is the most cost-effective bonding agent but it is possible to use also other agents instead of polyester resin. So the invention has not been restricted only to polyester resin.

Also it is possible to use in the inventive product, in its fibres, in its bonding agent or in both of them different additives to increase or to decrease certain physical or chemical properties or characteristics of the product. This kind of properties or characteristics can be for instance weight, colour, elasticity, stiffness, opacity, electrical conductivity, corrosion resistance etc.

In the inventive product said stacked and bonded fibre sheets are advantageously unidirectionally one upon the other. However it is also possible that stacked sheets are not unidirectional so that the main directions of at least some of the aligned sheets are in an angle with respect to each other.

The method and the artificial wood product in accordance with the present invention have considerable advantages compared with prior art. In accordance with the invention it is possible to produce lumber, boards, planks or balks which resemble almost completely corresponding natural products. At a distance of a couple of meters it is almost impossible to distinguish said inventive artificial wood product from a real natural wood product. With this new invention the demand for tropical natural wood in the international markets can be decreased remarkably. So the invention creates good possibilities to save tropical forests and to stop the tropical deforestation.

LIST OF FIGURES

Figure 2:
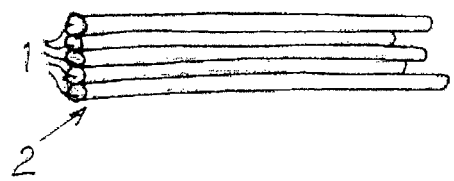
Figure 3:
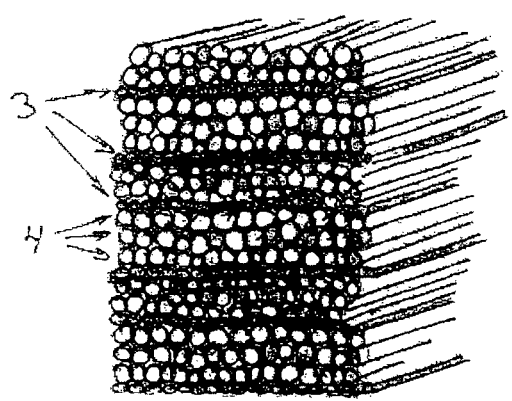
Figure 4:
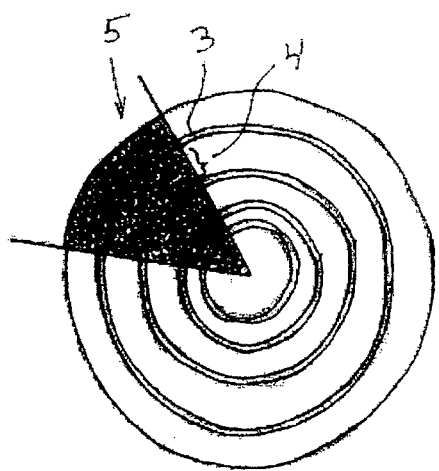

In the following section, the invention will be described in detail with reference to the accompanying drawings, in which
FIG. 1 represents a single fibre,
FIG. 2 represents a strand wire,
FIG. 3 represents an embodiment of the invention and
FIG. 4 represents another embodiment of the invention.

DETAILED DESCRIPTION OF THE INVENTION

FIG. 1 represents one single fibre 1, natural or artificial, that can be used in the invention. Normally the cross section of the fibre is more or less round and the diameter of the fibre can be from 20 µm to some mm. The length of the fibre can be even hundreds of meters if needed.

FIG. 2 describes the structure of a strand wire 2. Every strand of fibre and the sheet of fibres, ie. strand wires are pre-impregnated with a bonding agent. In a strand wire 2 several fibres 1 have been bonded adjacently together with a bonding agent. So the fibres form with a bonding agent a flat and thin sheet, the length of which is unlimited and can vary depending on the final products.

FIG. 3 describes one embodiment of the invention. The artificial wood product of FIG. 3 is a square beam made of several strand wires 2 bonded together one upon the other with polyester resin or similar other bonding agent. The product has been made from strand wires of different colour so that every fourth layer 3 of the structure is darker than the other three layers 4 or strand wires. Three lighter strand wires together with one darker strand wire describe one annular growth ring of tree growth.

As can be seen from those light three layers, all the fibres are not necessarily of the same colour. It is possible that some of the fibres in the same strand wire are darker than the other fibres so that the structure resembles more a natural wood.

Different additives may also act as an important role to imitate annular wood growth pattern as the use of additives control the imitation of porosities of each layer, thus representing different seasons of wood growth. High density and often darker layers represent dry seasons of tree growth.

FIG. 4 describes another embodiment of the invention. The artificial wood product of FIG. 4 has been made in the same way as the product of FIG. 3. Only the layers, ie. strand wires are round and stacked one upon the other so that the final product is a round artificial log. This wood looking log can be used as such in different solutions just like natural logs or it can be sawn to sectors 5 as shown in the figure or to any size square timber.

The invention is not limited merely to the examples referred to above; instead many variations are possible within the scope of the inventive idea defined by the claims.

The invention claimed is:

1. A method for producing an artificial wood product, comprising:
   aligning a plurality of fibres longitudinally to form a plurality of strand wires;
   bonding said strand wires, which are arranged unidirectionally and side by side, together by a bonding agent to form a plurality of fibre sheets comprising layers of strand wires; and
   stacking said fibre sheets one upon another in layers, and bonding the stacked fibre sheets by the bonding agent to form an elongated wood product having a round cross section, wherein said fibre sheets are formed with strand wires of different colors in different layers,
   wherein said fibre sheets are selectively stacked to replicate colour and thickness variation of annular growth rings of natural wood to form said elongated wood product with a round cross-section.

2. The method according to claim 1, wherein said fibre sheets are stacked together, with the corresponding fibres and strand wires of the fibre sheets arranged unidirectionally, to form said elongated wood product.

3. The method according to claim 1, wherein said fibre sheets are stacked into a mould in a form of said elongated wood product.

4. The method according to claim 1, wherein thicknesses of said fibre sheets are adjusted to be different in different layers of the elongated wood product to replicate thickness variation of annular growth rings of natural wood.

5. The method according to claim 1, wherein said elongated wood product is sawn into a lumber, board, plank or balk of smaller cross-section.

6. The method according to claim 5, wherein the surface of said elongated wood product is planned and/or sanded down.

7. The method according to claim 1, wherein said elongated wood product is rotary-cut into a veneer.

8. The method according to claim 7, wherein a plurality of veneers are glued together with said bonding agent into a plywood panel.

* * * * *